(12) United States Patent  
Gouch

(10) Patent No.: US 7,706,632 B2  
(45) Date of Patent: Apr. 27, 2010

(54) METHOD AND APPARATUS FOR FORMING A MULTIPLE FOCUS STACK IMAGE

(75) Inventor: Martin Philip Gouch, Herts (GB)

(73) Assignee: FFEI Limited, Hemel Hempstead (GB)

( * ) Notice: Subject to any disclaimer, the term of this patent is extended or adjusted under 35 U.S.C. 154(b) by 1 day.

(21) Appl. No.: 12/015,870

(22) Filed: Jan. 17, 2008

(65) Prior Publication Data

US 2009/0185758 A1 Jul. 23, 2009

(51) Int. Cl.
*G06K 9/36* (2006.01)
*G06K 9/00* (2006.01)

(52) U.S. Cl. ........................ 382/284; 382/133; 382/141; 382/154; 345/629

(58) Field of Classification Search ......... 382/141–152, 382/133, 154, 284; 250/306–311; 348/86–95, 348/125–134; 700/95–212; 29/833; 438/16; 356/426–431, 237.1–237.6; 702/35–40; 345/419–427, 629–641
See application file for complete search history.

(56) References Cited

U.S. PATENT DOCUMENTS

| | | | |
|---|---|---|---|
| 4,099,051 A | | 7/1978 | Gugliotta |
| 4,812,643 A | | 3/1989 | Talbot |
| 4,844,617 A | | 7/1989 | Kelderman et al. |
| 5,248,876 A | * | 9/1993 | Kerstens et al. ........ 250/559.05 |
| 5,394,205 A | | 2/1995 | Ochiai et al. |
| 5,446,276 A | | 8/1995 | Iyoda et al. |
| 5,659,390 A | | 8/1997 | Danko |
| 5,763,871 A | | 6/1998 | Ortyn et al. |
| 5,793,379 A | * | 8/1998 | Lapidous ................. 345/606 |

(Continued)

FOREIGN PATENT DOCUMENTS

DE 200 16 490 U1 12/2000

(Continued)

OTHER PUBLICATIONS

"Entering the Age of Fluorescence Imaging in Digital Slide Technology"; Hamamatsu Photonics K.K., Systems Division; 2006; Japan.

*Primary Examiner*—Aaron W Carter
(74) *Attorney, Agent, or Firm*—Sughrue Mion, PLLC

(57) ABSTRACT

A method of producing a multiple focus stack image of a target, the stack image comprising a plurality of images of the target, each image having a corresponding focal range or position, wherein the method comprises causing relative scanning movement between the target and an array of light detectors, the array being used to repeatedly receive image information from the target during the scan in the form of scan lines; and causing the relative focus between the target and the array to be modified between the said focal ranges or positions of the respective images during the scan so as to obtain scan lines corresponding to each focal range or position during the scan, thereby obtaining the images in the stack, wherein each image is formed from the image information obtained as scan lines at the respective focal range or position during the scan. The method is then further characterized in that the relative focus is cycled between two extreme focal ranges or positions during the relative scanning movement and at least one scan line is obtained at a focal range or position located between subsequent extreme focal ranges or positions during the scan, each scan line being used to form one of the images of the target.

25 Claims, 8 Drawing Sheets

U.S. PATENT DOCUMENTS

| | | |
|---|---|---|
| 5,912,699 A | 6/1999 | Hayenga et al. |
| 6,091,075 A | 7/2000 | Shibata et al. |
| 6,201,619 B1 * | 3/2001 | Neale et al. .................. 358/505 |
| 6,538,249 B1 * | 3/2003 | Takane et al. ................... 850/9 |
| 6,580,502 B1 | 6/2003 | Kuwabara |
| 6,711,283 B1 * | 3/2004 | Soenksen .................... 382/133 |
| 6,875,973 B2 | 4/2005 | Ortyn et al. |
| 7,015,418 B2 | 3/2006 | Cahill et al. |
| 7,109,459 B2 | 9/2006 | Kam et al. |
| 7,485,834 B2 | 2/2009 | Gouch |
| 2003/0067596 A1 | 4/2003 | Leonard |
| 2003/0160957 A1 | 8/2003 | Oldham et al. |
| 2004/0256538 A1 | 12/2004 | Olson et al. |
| 2005/0286800 A1 | 12/2005 | Gouch |
| 2006/0238847 A1 | 10/2006 | Gouch |
| 2007/0036462 A1 * | 2/2007 | Crandall et al. ............. 382/284 |
| 2007/0147673 A1 | 6/2007 | Crandall |

FOREIGN PATENT DOCUMENTS

| | | |
|---|---|---|
| EP | 1 593 957 A1 | 11/2005 |
| WO | WO 01/37025 A1 | 5/2001 |

* cited by examiner

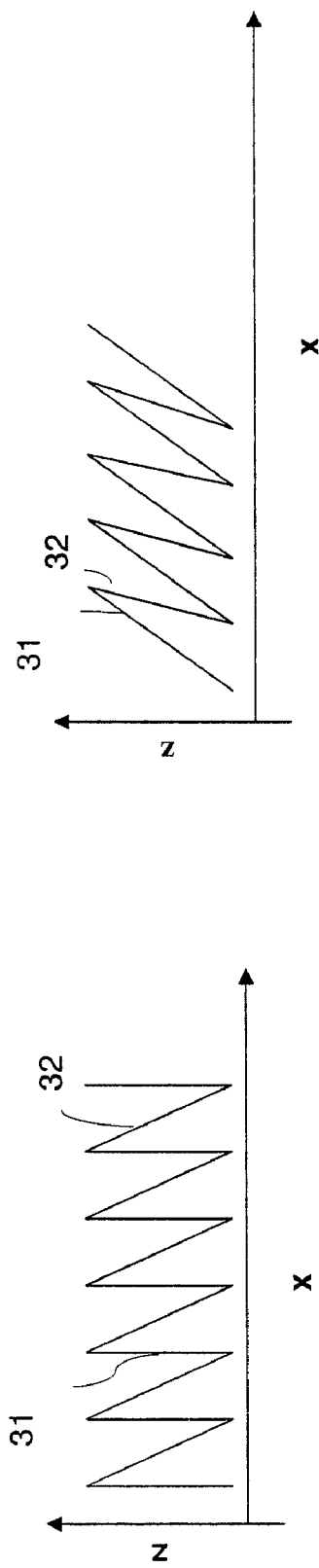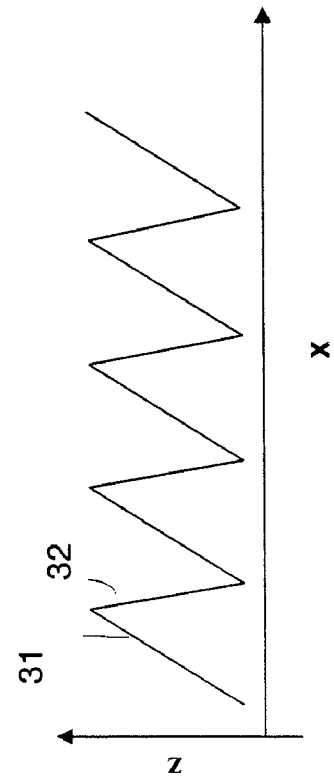
Figure 3A PRIOR ART
Figure 3B PRIOR ART
Figure 3C PRIOR ART

METHOD AND APPARATUS FOR FORMING A MULTIPLE FOCUS STACK IMAGE

BACKGROUND OF THE INVENTION

1. Field of the Invention

The present invention relates to a method and apparatus for forming a multiple focus stack image.

2. Description of the Related Art

There are many situations wherein an image scanning apparatus is used to obtain an image of a target. For example, in medical applications images of biological samples are often required. Such images are typically obtained using a microscope and digital image sensor.

One problem that occurs when generating an image of a target is that often the depth of focus provided by the optical arrangement of the apparatus is less than the variation in the height of the target to scan. For example, when using a 40× lens with a numerical aperture of 0.65, the depth of focus is around 1 micrometer. A typical microscope slide is not manufactured to hold this sort of tolerance and when mounted the slide may flex in access of one micrometer due to the mounting method or the forces of gravity. Additionally the sample being imaged may not itself be flat to one micrometer.

Within the art there are a number of methods to overcome this problem. In certain systems a focus map is generated using an image sensor during an initial scan of the target to be captured. This focus map is then used to adjust the focus of the imaging system whilst the final detailed image of the sample is obtained. This method generates problems in that it requires the building of a focus map for each sample, which is typically a time-consuming process.

An alternative method to address the above problem is to use multiple image scans at different focus levels. This is called focus stacking or z-stacking. A stack of z images are generated at z-focus positions using one or more image sensors and these images are then combined at a later date to give a single in-focus image. Suitable software for combining such images can be obtained from a number of suppliers.

European Patent Publication No. 1610166 provides a method and apparatus for generating such a multiple focus stack image. This publication teaches the use of a one-dimensional linear array as shown in FIG. 1A. The array 1 is moved in a direction of traverse 10 across the target and during this scanning motion a number of images at a number of different focus positions are generated. Typically, as the array 1 is moved in the direction of traverse 10, a lens assembly is moved to capture an image at each focus position.

The scanning motion performed by such a lens assembly is illustrated schematically in FIGS. 2A and 2B. To generate a final image at a selected focus position a number of scan lines are captured by the array 1. In FIG. 2A a first image at a first focus position is generated from scan lines 1,4,7,10, etc; a second image at a second focus position is generated from scan lines 2,5,8,11, etc.; and a third image at a third focus position is generated from scan lines 3,6,9,12 etc. The motion illustrated in FIG. 2A begins with the capture of a scan line 1. The lens assembly is then moved in order to alter the focus position. In the case of FIG. 2A, the lens assembly is held static in the direction of traverse 10 and is then moved perpendicular to the traverse direction so that scan line 2 can be captured. After the capture of scan line 2, the lens assembly is then further moved to the third focus position to scan line 3 while holding the array 1 static in the direction of traverse 10. After the capture of scan line 3 the array 1 is moved in the direction of traverse 10 and the lens assembly performs what is called a "flyback" movement, wherein the lens assembly moves from the third focus position to the first focus position. The lens assembly and array 1 are then in a position to capture a subsequent set of scan lines (4,5,6) at the three different focus positions. This process then continues until the total length of the target has been traversed.

The movement used to generate the sequence of FIG. 2A is shown in FIG. 3A. The X-axis represents the direction of traverse and the Z-axis represents the direction of movement of the lens assembly that enables a change in the focus position. The complete movement of the lens assembly thus comprises movement 31 and flyback movement 32.

Two variations on the method of scan line generation shown in FIG. 2A are shown in FIGS. 2B and 2C. In both FIGS. 2B and 2C after each scan line has been captured, the array 1 is moved a set distance in the direction of traverse 10. Typically this distance is equal to the width of the one-dimensional sensor array 1. After scan line 3 at the third focus position has been captured, the lens assembly again performs a flyback movement back to the first focus position in order to be ready to generate scan line 4 at the first focus position. In FIG. 2B, the flyback movement also involves a movement in a direction that is opposite to direction of traverse as shown in FIG. 3B, i.e. scan line 4 is aligned with scan line 2 in the direction of traverse. As can be seen in FIG. 2B, this process is repeated along the direction of traverse to produce the complete movement of the lens assembly shown in FIG. 3B. In FIG. 2C the flyback motion involves a rapid motion in the direction of traverse 10, and the scanning motion is repeated. Again, in both cases, the movement of the lens assembly comprises a scanning movement 31 and a flyback movement 32.

One problem that occurs with such a scanning motion is that large accelerations are required for the flyback motion. These large accelerations can produce unwanted and destructive forces within the mechanisms responsible for obtaining the different focus positions and their associated mountings and can also lead to jitter aberrations in a resultant image. This becomes especially problematic when the flyback motion involves a movement in the direction opposite to the direction of traverse, as the accelerations are applied in a direction opposite to the normal scanning direction.

Thus there is required a solution to the problem of efficiently generating a multiple focus stacked image without applying unwanted forces to the electrical and/or mechanical assemblies responsible for obtaining a number of different focus positions.

SUMMARY OF THE INVENTION

According to a first aspect of the present invention there is provided a method of producing a multiple focus stack image of a target, the stack image comprising a plurality of images of the target, each image having a corresponding focal range or position, the method comprising:— causing relative scanning movement between the target and an array of light detectors, the array being used to repeatedly receive image information from the target during the scan in the form of scan lines; and causing the relative focus between the target and the array to be modified between the said focal ranges or positions of the respective images during the scan so as to obtain scan lines corresponding to each focal range or position during the scan, thereby obtaining the images in the stack, wherein each image is formed from the image information obtained as scan lines at the respective focal range or position during the scan;

wherein:

the relative focus is cycled between two extreme focal ranges or positions during the relative scanning movement and at least one scan line is obtained at a focal range or position located between subsequent extreme focal ranges or positions during the scan, each scan line being used to form one of the images of the target.

By cycling the relative focus during the relative scanning movement and obtaining at least one scan line during the cycling movement a smoother scanning motion is achieved and smaller accelerations are required when compared to prior art methods. This may result in a scan line being obtained at a focal position or range in each direction along a focal axis during the modification of the relative focus. This then reduces jitter and other image aberrations and furthermore reduces the stress on the apparatus providing the movement.

In certain embodiments the scan line density of a first image obtained at a first focal range or position may differ from the scan line density of a second image obtained at a second focal range or position, i.e. the resolution of one image may be greater than the resolution of the other image. In this case, the difference in scan line density or resolution may be corrected using interpolation.

The modification of the relative focus may be performed by moving the array of light detectors in a direction perpendicular to the direction of the relative scanning movement. Alternatively, a lens assembly, the target or a combination may also be moved in a direction perpendicular to the direction of the relative scanning movement. The trial positions in ranges may then lie upon a symmetrical waveform defined in a space characterised by these two directions. Preferably the array is a one-dimensional array that extends perpendicular to the direction of the relative scanning movement and is positioned in a plane parallel to the target.

Each scan line produced at a particular focal position or range may be offset from a previous scan line by a predetermined distance in the direction of the relative scanning movement image. This predetermined distance may be a fraction of a width of the array of light detectors, typically a half, a third, a quarter or a sixth. The symmetrical waveform that characterises the focal positions may comprise a substantially periodic and/or continuous waveform such as a sinusoid. As the sinusoidal waveform has no discontinuities the motion during the relative focus modification minimises any resultant accelerations. This further minimises the mechanical stresses on the assembly providing the movement. In certain embodiments the sinusoidal waveform can be approximated using a saw-tooth waveform.

Typically, the stack image comprises at least three images of the target, wherein a first set of one or more scan lines corresponding to a first image is obtained at the first extreme focal position or range, a second set of one or more scan lines corresponding to a second image is obtained at the second extreme focal position or range, and a third set of one or more scan lines corresponding to a third image is obtained at a focal position or range between the two extreme focal positions or ranges. In certain embodiments said images may be evenly spaced in the focus direction. By obtaining a scan line image at these positions, a continuous movement can be used to produce the modification of relative focus. As stated before such a continuous motion reduces the stress on the scanning components and leads to smoother movement which produces a better quality image.

In certain cases, when cycling between the two focal positions or ranges at high frequencies with respect to a constant relative scanning movement, the third set of scan lines may overlap each other. In this case the third image can be reinterpolated to adjust the resolution of the image. In a lower frequency case the first and second images may comprise a reduced number of scan lines when compared to the third image. In this case, the first and second set of scan lines may be respectively interpolated to obtain first and second images with a resolution equal to the third image. By providing interpolation, any over or under population of an image can be corrected during subsequent software processing. This is a tractable task whereas the removal of jitter or the refocusing of a poorly focused image is not.

According to a second aspect of the present invention there is provided an apparatus for producing a multiple focus stack image of a target, the stack image comprising a plurality of images of the target, each image having a corresponding focal range or position, the apparatus comprising:— an array of light detectors for receiving image information from a target in the form of scan lines;

a scan device for providing relative movement between the array and the target;

a focus device for controlling the relative focus between the array and the target, and, a control system for operating the scan device for causing relative scanning movement between the target and the array of light detectors; and further adapted for controlling the array to repeatedly receive image information from the target during the scan; and for operating the focus device for causing the relative focus between the target and the array to be modified between the said focal ranges or positions of the respective images during the scan so as to obtain scan lines corresponding to each focal range or position during the scan, thereby obtaining the images in the stack, wherein each image is formed from the image information obtained as scan lines at the respective focal range or position during the scan.

wherein the control system is further adapted to operate the focus devise to cycle between two extreme focal ranges or positions during the relative scanning movement and to obtain at least one scan line at a focal range or position located between subsequent extreme focal ranges or positions during the scan, each scan line being used to form one of the images of the target.

This apparatus may be adapted to perform any of the method steps of the first aspect of the invention and allows all the advantages previously discussed. This apparatus may form part of a microscope assembly for imaging microscopic targets. Hence high resolution images of biological samples may be obtained using the method or apparatus of the present invention. Such images were not possible using the systems of the prior art.

BRIEF DISCUSSION OF THE DRAWINGS

FIGS. 3A, 3B and 3C show waveforms associated with said prior art scanning motions;

DETAILED DESCRIPTION OF THE PREFERRED EMBODIMENTS

Figure 1A:
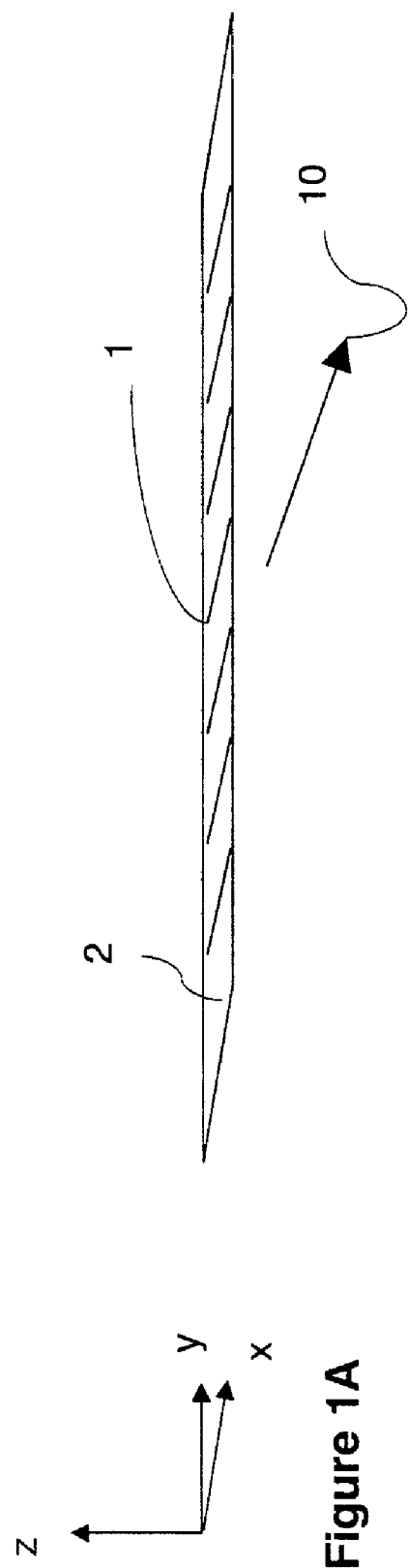
FIG. 1A illustrates a schematic view of an exemplary one-dimensional light detector array for use with the present invention.

Normal line scanning involves a single line array of x pixels, each pixel typically corresponding to a detector in the array. For the production of colour images, a single line for each of the three colours is provided (for example one of red, green or blue (RGB)). This single line array is then traversed in a direction perpendicular to the line of the detector array. The traverse speed is set so that after one "line time" of the detector, i.e. the time required to capture a single scan line, the detector has traversed by a distance of one pixel in the scan direction so that the next line time produces a line of pixels abutted to the previous line. This is represented schematically in FIG. 1A wherein a one-dimensional array 1 comprising eight detectors 2 is scanned in the direction of the traverse as indicated by the arrow 10.

Figure 1B:
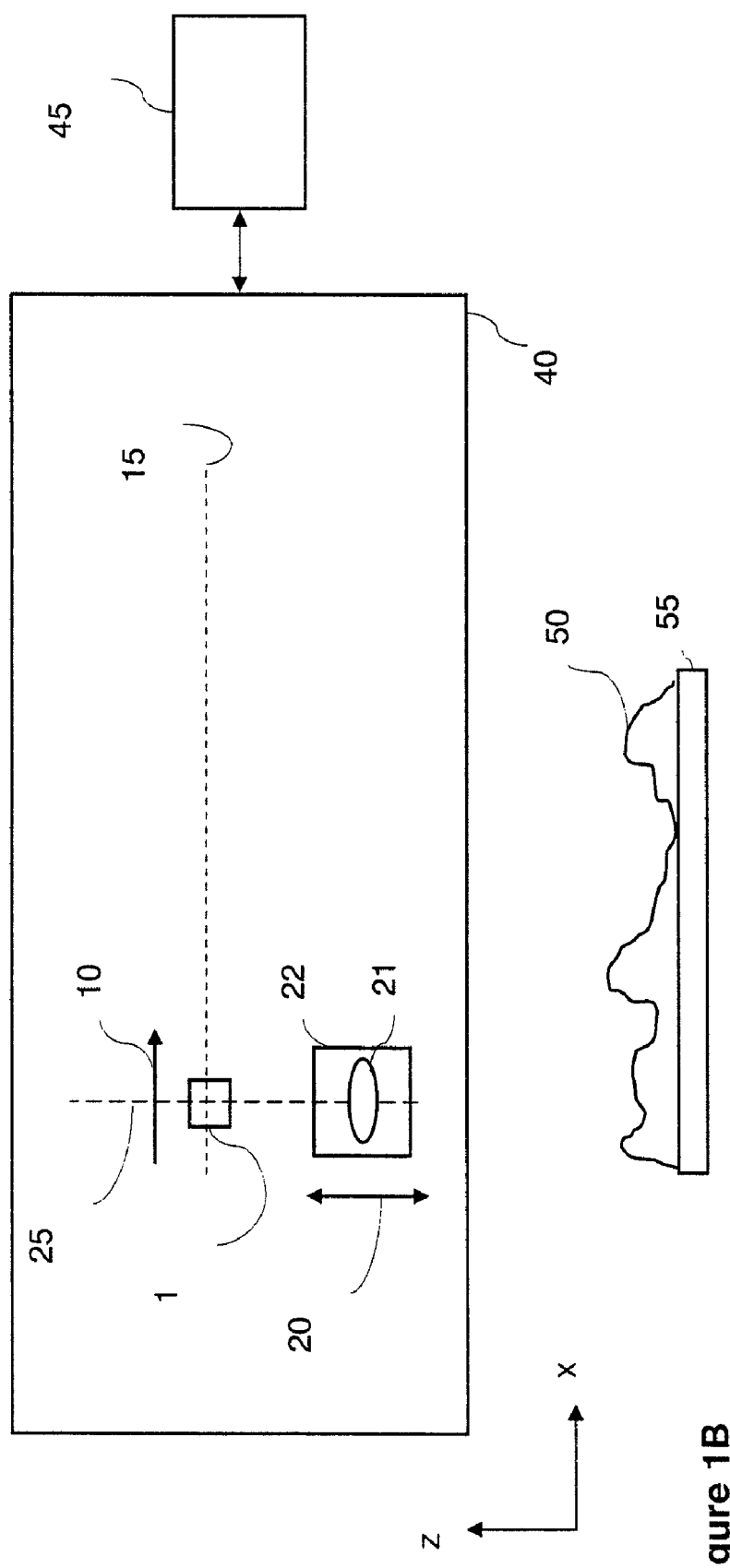
FIG. 1B illustrates a schematic diagram of an exemplary set of apparatus for use within the present invention.
Figure 2A:
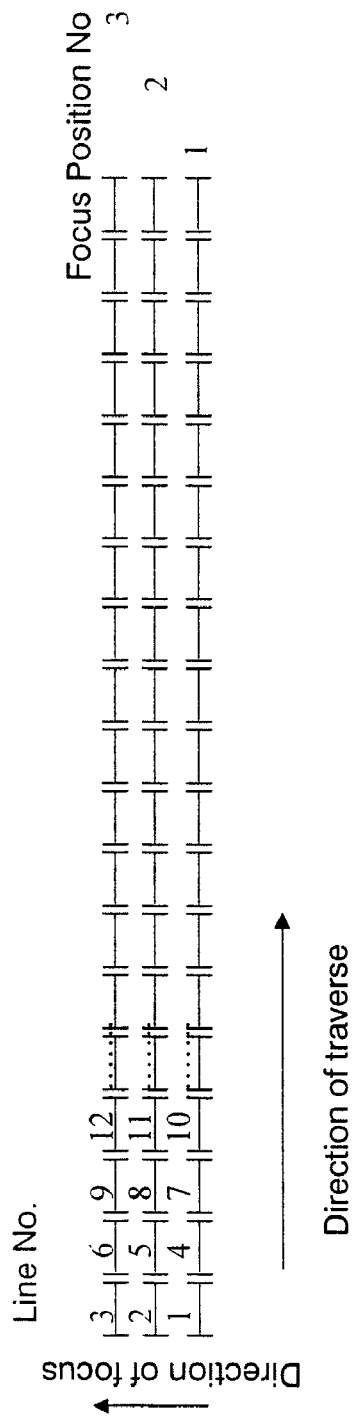
FIGS. 2A, 2B and 2C represent prior art methods of implementing scanning motion to create a multiple focus stack image.
Figure 2B:
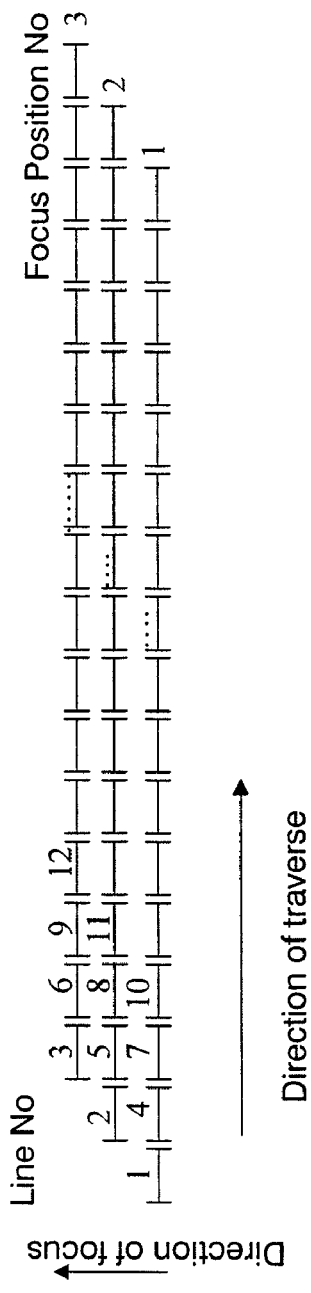
Figure 2C:
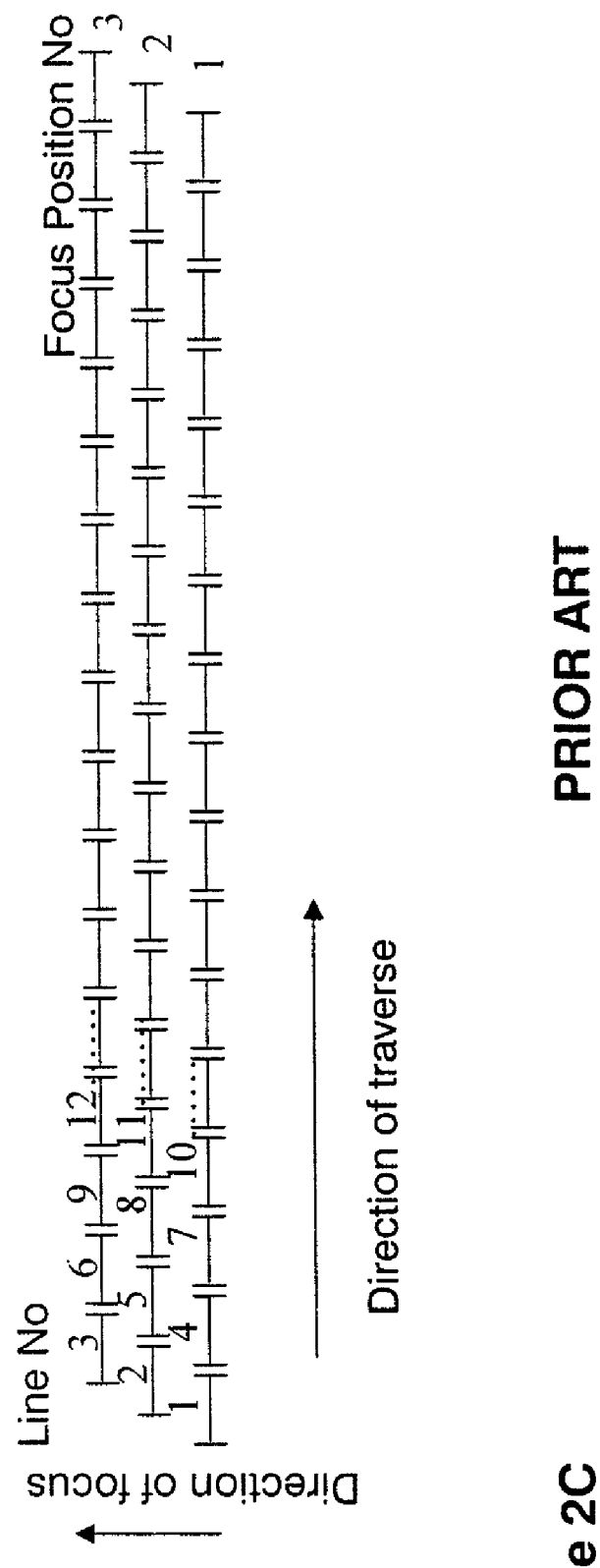

FIG. 1B illustrates an exemplary system that may be used to produce a scanning motion in the direction of the traverse 10 but also produce another scanning motion in a direction perpendicular to the traverse 20 which enables a scan line of pixels to be produced for a plurality of focus positions. The apparatus comprises a lens and detector assembly 40 and a control system 45. The lens and detector assembly 40 is operably connected to the control system 45 and is adapted to receive control signals from the control system 45. These control signals control the movements of optical components within the assembly 40 which enables both scanning motions. The control system 45 may also be adapted to receive image data captured during the scanning motions or alternatively this data may be sent to a separate imaging system. The lens and detector assembly 40 comprises a light detector array 1 which is a linear detector array that extends in a direction perpendicular to the Figure (i.e. in the y axis—not shown) in a similar manner to the array shown in the perspective drawing of FIG. 1A. The light detector array 1 is adapted to move in the direction of traverse 10. The linear axis of this movement is represented by line 15. This movement may be achieved using, amongst others, a mechanical rack and pinion system. In use the light detector array 1 is adapted to receive light from lens 21. Lens 21 is connected to lens mounting 22. Lens mounting 22 is adapted to move in direction 20, perpendicular to the direction of the traverse 10. The linear axis of this movement of the lens 21 is represented by line 25. This movement may be achieved using, amongst others, a mechanical rack and pinion system, a piezoelectric actuator or a voice coil actuator.

The lens and detector assembly 40 is adapted to produce an image of a sample 50 of variable thickness that is positioned upon slide 55. As is shown in FIG. 1B the sample 50 may have an uneven surface and so it may not be suitable to use a single "best focus" position for the entire scan of light detector array 1. Alternatively, slide 55 may flex within its mounting to produce a non-flat sample surface. Hence, a number of images are generated at a number of different focus positions to produce a final in-focus image after subsequently image processing. To obtain these images the lens 21 is moved in direction 20, which alters the focus position for a particular area of sample underneath the lens.

Even though the present example is described in relation to a system wherein the lens and light detector array are adapted to move in perpendicular directions, it is possible to use alternative movements to produce the scanning motion in the direction of traverse 10 and the focus position movement in direction 20. For example, the slide 55 may be moved in the direction of traverse 10 instead of the light detector array 1 and/or moved up and down in direction 20 instead of moving the lens 21 as depicted in FIG. 1B.

Figure 4A:
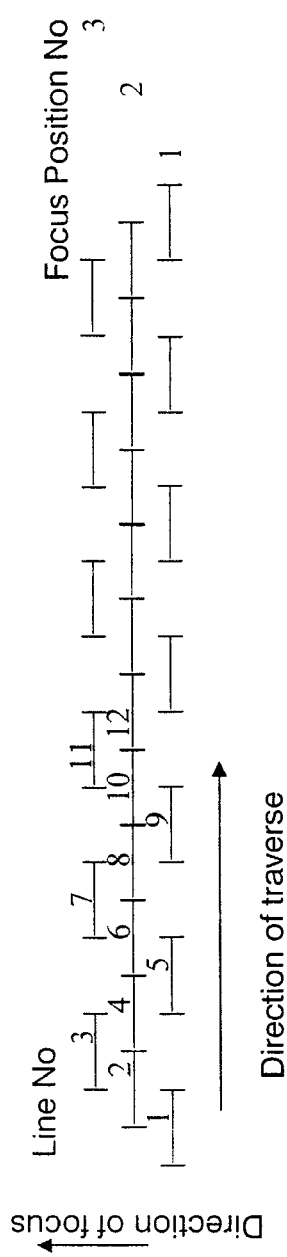
FIG. 4A illustrates an exemplary scanning method according to a first embodiment of the present invention.
Figure 4C:
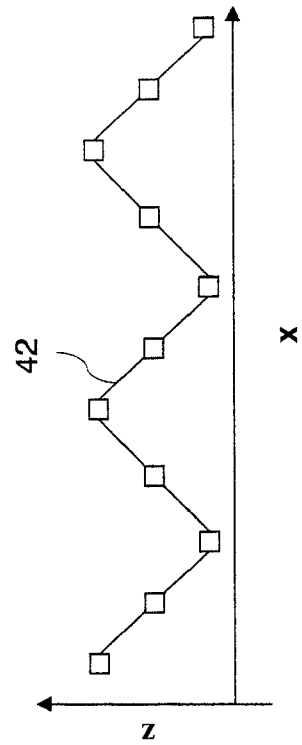
FIGS. 4B and 4C illustrate exemplary waveforms that can be used to implement the first embodiment of the present invention.
Figure 4B:
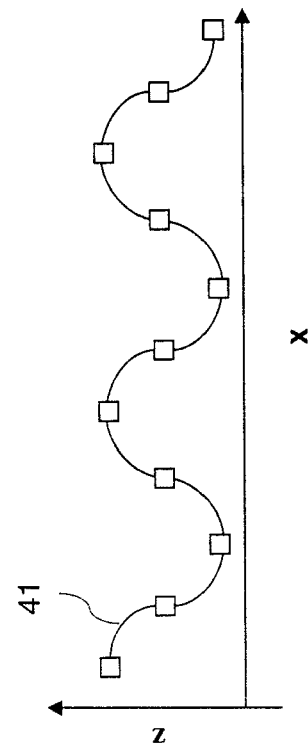

A first embodiment of the present invention will now be described in relation to FIGS. 4A to 4C. FIG. 4A illustrates an example scanning method that can be used to produce three images of the sample 50 at three respective focus positions. The scanning method begins with the generation of a first scan line 1 that represents a first line of a first image of sample 50. This scan line is obtained by reading the pixels of the light detector array 1 at a first focus position. After this scan line has been obtained then the light detector array 1 is moved in the direction of the traverse 10 and at the same time the lens 21 is moved in direction 20 so that the position of focus changes to a second focus position. At this second focus position, a second scan line 2 is captured using the light detector array 1. The second scan line 2 represents a first line of a second image of sample 50. Between capturing the first scan line 1 and the second scan line 2 the light detector array 1 moves a half of the width of the light detector array 1 in the direction of the traverse 10. In the present example, this distance is around 0.25 micrometers, but distances between 0.1 and 0.5 micrometers are also contemplated. After the second scan line 2 has been captured the light detector array 1 moves again in the direction of traverse 10 by a predetermined distance (in this case a half of the width of the array 1) and the lens 21 is moved in direction 20 in order to alter the focus position to a third position wherein a third scan line 3 can be obtained. The third scan line 3 represents a first line of a third image of sample 50. As before when the third scan line 3 is captured the light detector array 1 has moved a half of the width of the array 1 in the direction of traverse from its position when capturing the second scan line. After the third scan line 3 has been obtained then the light detector array 1 is again moved by the predetermined distance in the direction of the traverse 10 and the lens 21 is moved in direction 20 back to the second focus position in order to obtain a fourth scan line 4. After a fourth scan line 4 has been captured the lens 21 is moved to the first focus position to capture a fifth scan line 5. In a typical lens and detection assembly the range of motion in the z or focus direction during a scan is typically of the order of 7 to 9 micrometers. The length of the traverse scan will depend on the size of the sample but is typically 15 to 25 millimeters, although in certain circumstances the distance traversed by a scan may be as long as 65 millimeters. Between capturing successive scan lines in a particular stack the lens 21 typically moves between 1 to 3 micrometers in direction 20. This cycle then continues to capture a sixth, seventh, eighth, ninth, tenth etc scan line.

To produce the movement shown in FIG. 4A a waveform can be generated to move the lens 21 as the light detector array 1 performs a constant velocity scan in the direction of the traverse 10. For example, the waveform 41 illustrated in FIG. 4B shows the position of the lens 21 in the z-direction (direction 20) as a function of the position of the light detector array 1 in direction x (direction 10). If the light detector array 1 is moved at a constant speed in direction 10 then the waveform 41 of FIG. 4B will also represent the movement in time of the lens 21. The position of the lens 21 can either be controlled as a function of time or as a function of the distance traversed by the light detector array 1. The control system 45 is adapted to obtain a scan line from the light detector array 1 at both the maximum and minimum points (i.e. the extreme positions) on this waveform 41 and the points of inflection. In real terms this means that a number of scan lines at a number of different focus positions are captured during both the upward and downward movements of the lens. This enables scan line capture during the flyback motion which increases efficiency. The scan lines (1,5,9) obtained when the waveform is at a minimum correspond to focus position 1, the scan lines (2,4, 6,8,10) obtained at the points of inflection correspond to focus position 2 and the scan lines (3,7,11) obtained at a maximum of the waveform correspond to focus position 3. Comparing FIG. 4B with FIGS. 3A to 3C it is clear that the rapid accelerations of a flyback line 32 are reduced when using the sinusoidal waveform, leading to a smoother motion which reduces image "jitter". The sinusoidal waveform 41 can be approximated by the saw-tooth waveform 42 shown in FIG. 4C.

The scan lines from the first focus position (1,5,9 etc.) are used to form the first image in the multiple focus stack image, the scan lines from the second focus position (2,4,6,8,10) are used to form the second image in the multiple focus stack image and the scan lines from the third focus position (3,7,11) are used to form the third image in the multiple focus stack image. As seen by the gaps in the series of scan lines in the first and third focus positions, the first and third images will be underpopulated in comparison to the image generated from the scan lines obtained at the second focus position, i.e. the first and third images will have a lower resolution than the second image. This underpopulation means that the first and third images will lack a pixel of image data between each pair of pixels obtained in the direction of traverse. These outer images can be adjusted to have a resolution equal to that of the middle image using interpolation techniques. If the pixel size is less than the optical resolution then little detail is lost by subsampling the first and third images. Typical values of optical resolution are around 0.5 micrometers per pixel.

Figure 5A:
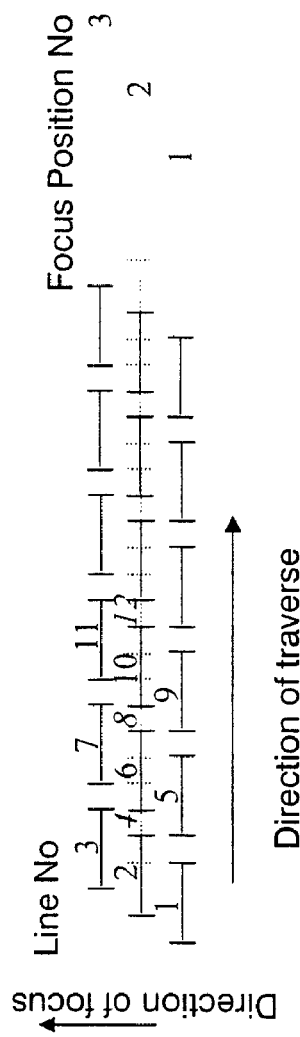
FIG. 5A illustrates a scanning method according to a second embodiment of the present invention; and, FIGS. 5B and 5C illustrate waveforms that can be used to implement the second embodiment of the present invention.
Figure 5C:
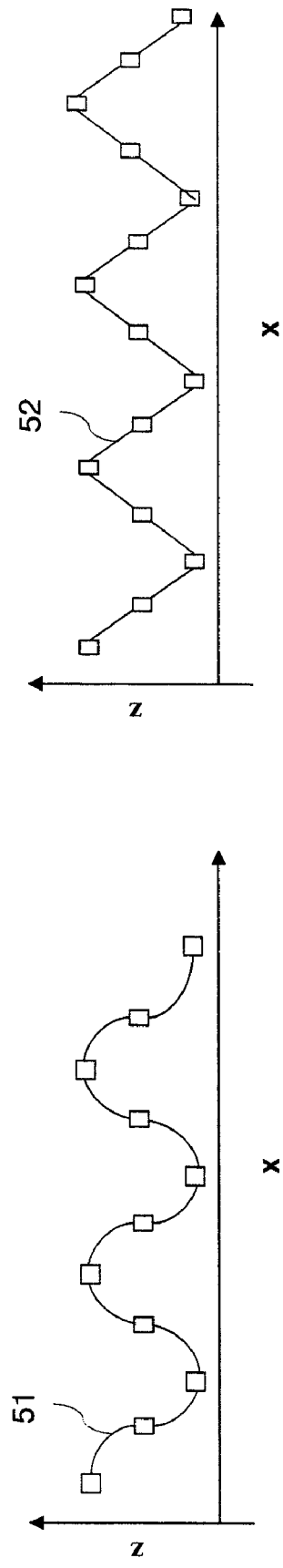
Figure 5B:
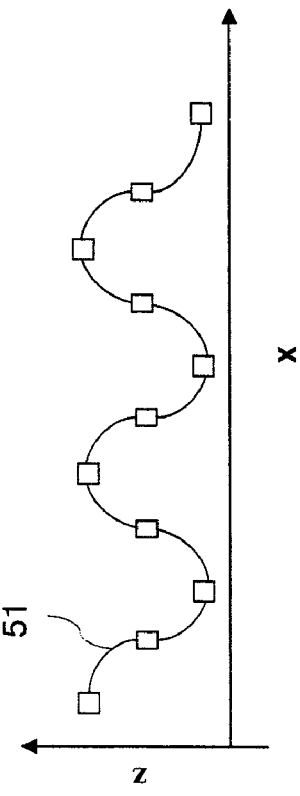

A second embodiment of the present invention is shown in FIG. 5A. FIG. 5A represents a scanning motion similar to that of FIG. 4A but instead of offsetting each subsequent scan line by a half in the direction of the traverse 10, the second embodiment offsets each scan line by a third of the width of the light detector apparatus 1 in the direction of the traverse 10. By decreasing the distance moved by the light detector array 1 after the capture of each scan line, the resolution of the images created from the scan lines at the first and third focus positions is increased at the extent of overpopulating the second image. This overpopulation can be seen in FIG. 5A in that dashed scan lines 4,8 and 12 respectively overlap scan lines 2 and 6, 6 and 10, and 10 and 14. However, such overpopulation can be adjusted for by reinterpolating the image generated using the scan lines obtained at the second focus position to provide a uniform resolution. By increasing the frequency of the symmetrical waveform, as can be seen in FIGS. 5B and 5C an increased resolution is provided at the cost of some overlap of the scan lines obtained at the second focus position. The frequency of the symmetrical waveform determines the amount the light detector array 1 is to be moved between the capture of each scan line. Even though the specific examples of a half and a third of the light detector array width have been used in these two embodiments the present invention can be applied using any fraction of the width of the one-dimensional array 1.

Typically the image produced from the scan lines obtained at the second focus position represents an in-focus image and the images produced from the scan lines obtained at the first and third focus positions represent out of focus images recorded above and below the in-focus position. It is possible to apply the methods of the present invention to situations wherein more than three focus positions are used in which case the additional scan lines will be obtained at points in waveform between the maximum and minimum points. As the out-of-focus positions represent out-of-focus images, which will typically be used to a lesser extent than the in-focus image to generate a multiple focus stack image, the fact that these images are underpopulated when using the first embodiment does not significantly affect the quality of the final image.

Figure 6B:
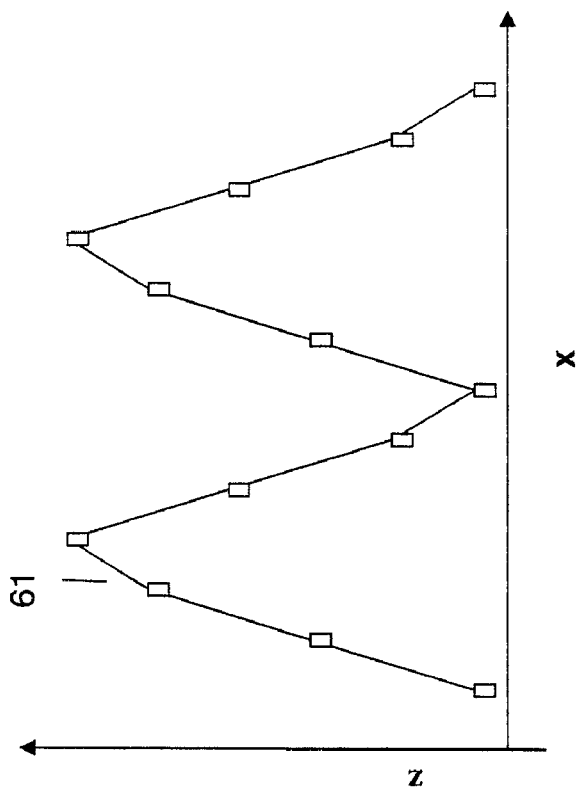
FIG. 6B illustrates a waveform that can be used to implement the third embodiment of the present invention.
Figure 6A:
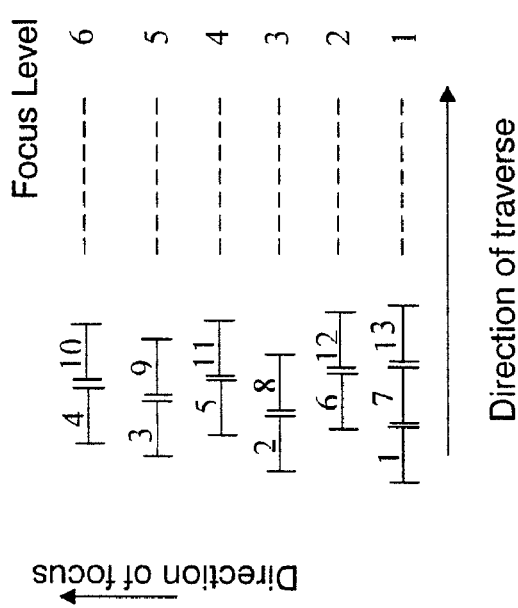
FIG. 6A illustrates a scanning method according to a third embodiment of the present invention.

A third embodiment of the present invention is shown in FIGS. 6A and 6B. In this case, six focus positions are used to provide a multiple focus stack image comprising six separate images. As with the previous examples, the scanning method begins with the generation of a first scan line 1 that represents a first line of a first image of sample 50. This scan line is obtained by reading the pixels of a light detector array 1 at a first focus position. After the scan line has been obtained then light detector array 1 is moved in the direction of the traverse 10 and at the same time the lens 21 is moved in direction 20 so that the focus position changes to a third focus position to obtain a second scan line 2. This third focus position is located two focus levels above the first focus position, i.e. between the first and third focus positions there is a second focus position that is used later on in the scan. In the present case, the light detector array 1 moves by a distance of one sixth in the direction of traverse 10 between capturing the first scan line 1 and second scan line 2.

After the second scan line 2 has been captured the light detector array 1 moves again in the direction of traverse 10 by a predetermined distance (in this case a sixth of a width of the array 1) and the lens 21 is moved in direction 20 in order to alter the focus position to a fifth focus position wherein a third scan line 3 is obtained. The focus movement performed between the capture of the second and third scan lines represents a jump of two focus levels; i.e. between the third and fifth focus positions there is a fourth focus position at which a further scan line is obtained at a later point within the scan.

After the third scan line 3 has been captured the light detector array 1 again moves in the direction of traverse 10 by the predetermined distance. However, during the next focus movement the lens 21 is moved to effect a sixth focus position that is only one level above the fifth focus position. After a fourth scan line 4 has been obtained at the sixth focus position, the light detector array 1 is further moved in the direction of traverse 10 by the predetermined distance and the lens 21 is moved in the direction 20 to change the focus position from the sixth focus position to a fourth focus position located below the fifth focus position. During this focus movement the lens 21 is moved in the opposite direction to previous focus movements, i.e. the lens 21 is moved toward the sample rather than toward the array. After the fifth scan line 5 has been obtained at the fourth focus position the light detector array 1 is moved again by the predetermined distance in the direction traverse 10 and the lens 21 is moved toward the sample to effect a second focus position located below the third focus position. At the second focus position a sixth scan line 6 is obtained. After the sixth scan line 6 has been obtained, the light detector array 1 is moved by the predetermined distance in the direction of traverse 10 and the lens 21 is moved a single focus level back to the first focus position wherein a seventh scan line 7 is obtained. The process then repeats in a similar manner for scan lines 8 to 13.

After a complete scanning movement in the direction of traverse 10, the scan lines obtained at the various focus levels, one to six, are used to create six images that will be later used to create the multiple focus stack image. For example, scan lines 1, 7 and 13 are used to generate a first image at the first focus position, scan lines 6 and 12 are used to generate a second image at the second focus position and so on for the remaining sets of scan lines at the remaining four focus positions.

FIG. 6B illustrates a waveform that may be used to generate the scanning motion shown in FIG. 6A. It is clear from this waveform 61 that the third embodiment involves the capture of alternate scan lines in alternate movements along the z axis; i.e. scan lines 2 and 3 are obtained at the third and fifth focus positions on an upward movement of the lens 21 and scan lines 5 and 6 are obtained at the fourth and second focus positions on a downward movement of the lens 21. In effect, this waveform means that a jump of two focus levels is performed between capturing the second scan line 2 and the third scan line 3 but that a single focus level jump is performed between capturing the third scan line 3 and the fourth scan line 4; likewise a jump of two focus levels is performed between obtaining the fifth scan line 5 and the sixth scan line 6, yet a single focus level jump is performed when moving from the sixth scan line 6 to the seventh scan line 7. In this case the fourth and seventh scan lines represent the extreme focus positions within the scan.

Even though the third embodiment has been described with six focus levels a simpler version of the scanning movement is possible using only four focus levels; in this case a jump of two focus levels is made between obtaining the first and second scan lines and then a jump of one focus level is made between obtaining the second and third scan lines; conversely during lens movement in the opposite direction a jump of two focus levels is made between the third scan line and the fourth scan line and a jump of one focus level is made between the fourth scan line and the fifth scan line.

It is also possible within the scope of the third embodiment to jump by one focus level between obtaining the first and second scan lines and then subsequently jump two focus levels between obtaining the sixth and seventh scan lines; i.e. reverse the alternate order in which the scan lines at the different focus positions are obtained.

The method of the third embodiment is useful when using line scanning apparatus that obtains a multiple focus stack image comprising many composite images obtained at many focus levels. The method may be extended to stack images generated from any number of focus levels greater than three. By taking the scan lines on alternate lines, similar to interleaving the scan lines, the speed of a scanning movement in the direction traverse 10 may be increased.

What is claimed is:

1. A method of producing a multiple focus stack image of a target, the stack image comprising a plurality of images of at least a same area of the target, each image having a distinguished focus position or range of focus positions, the method comprising:

causing, by a scanning device, relative scanning movement between the target and an array of light detectors, the array being used to repeatedly receive image information from the target during the scan in the form of scan lines; and causing, by a focusing device, a relative focus between the target and the array to be modified between said focus positions or ranges of focus positions of the respective images during the scan so as to obtain scan lines corresponding to each focus position or range of focus positions during the scan, thereby obtaining the images in the stack, wherein each image is formed from the image information obtained as scan lines at the respective focus position or range of focus positions during the scan;

wherein the relative focus is cycled between two extreme focus positions or ranges of focus positions during the relative scanning movement and at least one scan line is obtained at a focus position or range of focus positions located between subsequent extreme focus positions or ranges of focus positions during the scan, each scan line being used to form one of the images of the target.

2. The method of claim 1, wherein the scan-line density of a first image obtained at a first focus position or range of focus positions differs from the scan-line density of a second image obtained at a second focus position range of focus positions.

3. The method of claim 2, wherein one or more of the images are interpolated to produce a uniform scan line density across two or more of the images.

4. The method according to claim 1, wherein the relative scanning movement is performed along a first axis and the cycling of the relative focus is performed by altering the focus of the target in two directions along a second axis, perpendicular to the first axis.

5. The method according to claim 4, wherein each focus position or range of focus positions lies upon a symmetrical waveform defined in a space characterized by the first and second axes, the symmetrical waveform comprising at least one of: a substantially periodic waveform, a substantially continuous waveform, a sawtooth waveform or a sinusoidal waveform.

6. The method according to claim 4, wherein the array of light detectors is a one-dimensional array that extends perpendicular to the first axis and is positioned parallel to the target.

7. The method according to claim 1, wherein the modification of the relative focus is performed by moving at least one of: the light detectors, a lens assembly, an imaging lens or component parts of an imaging lens.

8. The method according to claim 1, wherein each scan line corresponding to a particular focus position or range of focus positions comprises image information that is offset by a predetermined distance in the direction of the relative scanning movement from a previous scan line obtained at a previous focus position or range of focus positions, the predetermined distance being a proportion of the width of the array of light detectors.

9. The method according to claim 8, wherein the proportion of the width of the array of light detectors is one of a half, a third, a quarter or a sixth.

10. The method according to claim 1, wherein a first set of one or more scan lines corresponding to a first image is obtained at a first extreme focus position or range of focus positions, a second set of one or more scan lines corresponding to a second image is obtained at a second extreme focus position or range of focus positions, and a third set of one or more scan lines corresponding to a third image is obtained at a third focus position or range of focus positions between the first and second extreme focus positions or ranges of focus positions.

11. The method according to claim 10, wherein the third set of scan lines overlap each over.

12. The method according to claim 10, wherein the number of scan lines comprising the third set of one or more scans lines is greater the number of scan lines comprising the first and/or second set of scan lines.

13. The method according to claim 10, wherein one or more of the three images are interpolated to provide a uniform image resolution across all three images.

14. The method according to claim 10, wherein the focus positions or ranges of focus positions for the three images are evenly spaced.

15. The method according to claim 1, wherein the multiple focus stack image is obtained within a single scan of the target.

16. The method according to claim 1, further comprising combining the images in the stack so as to produce an output image having a depth of focus according to the focus positions or ranges of focus positions of the images from which it is constructed.

17. The method according to claim 10, wherein:
a fourth set of one or more scan lines corresponding to a fourth image is obtained at a fourth focus position or range of focus positions between the first and second extreme focus positions or ranges of focus positions;
the fourth focus position or range of focus positions differing from the third focus position or range of focus positions; and
scan lines from the third set and scan lines from the fourth set are only obtained on alternate movements between subsequent extreme focus positions or ranges of focus positions during the scan.

18. The method according to claim 1, wherein one or more focus images are produced from scan lines obtained when the focus is modified in a first direction and one or more focus images are produced from scan lines obtained when the focus is modified in a second direction.

19. Apparatus for producing a multiple focus stack image of a target, the stack image comprising a plurality of images of at least a same area of the target, each image having a distinguished focus position or range of focus positions, the apparatus comprising:
an array of light detectors for receiving image information from a target in the form of scan lines;
a scan device for providing relative movement between the array and the target;
a focus device for controlling, the relative focus between the array and the target, and, a control system for operating the scan device for causing relative scanning movement between the target and the array of light detectors; and further adapted for controlling the array to repeatedly receive image information from the target during the scan; and for operating the focus device for causing the relative focus between the target and the array to be modified between said focus positions or ranges of focus positions of the respective images during the scan so as to obtain scan lines corresponding to each focus position or range of focus positions during the scan, thereby obtaining the images in the stack, wherein each image is formed from the image information obtained as scan lines at the respective focus positions or ranges of focus positions during the scan;
wherein the control system is further adapted to operate the focus device to cycle between two extreme focus positions or ranges of focus positions during the relative scanning movement and to obtain at least one scan line at a focus position or range of focus positions located between subsequent extreme focus positions or ranges of focus positions during the scan, each scan line being used to form one of the images of the target.

20. Apparatus according to claim 19, wherein the control system is further adapted to operate the scan and focus devices to obtain a first image at a first focus position or range of focus positions and a second image at a second focus position or range of focus positions, the scan-line density of the first image differing from the scan-line density of the second image.

21. Apparatus according to claim 20, wherein the control system is further adapted to interpolate one or more of the first and second images to obtain a uniform scan-line density across both images.

22. Apparatus according to claim 19, wherein the scan device is adapted to move along a first axis, the focus device is adapted to move along a second axis and the focus positions or ranges of focus positions lie upon a symmetrical waveform defined using the first and second axis.

23. Apparatus according to claim 19, wherein the array comprises a one-dimensional array.

24. Apparatus according to claim 19, wherein the focus device effects the focus by at least one of: movement of the array, movement of the target movement of an imaging lens or movement of component parts of the imaging lens.

25. Apparatus according to claim 19, wherein the apparatus forms part of a microscope system for imaging microscopic targets.

* * * * *